US008219436B2

(12) United States Patent
Henry et al.

(10) Patent No.: US 8,219,436 B2
(45) Date of Patent: *Jul. 10, 2012

(54) ONLINE INSTALLATION SCHEDULING SYSTEM AND METHOD FOR CABLE SERVICES

(75) Inventors: Jeffrey L. Henry, San Antonio, TX (US); Robert W. Coughlin, Jr., Cary, NC (US); Donald G. Monteyne, Wayne, NJ (US)

(73) Assignee: Time Warner Cable, Inc., New York, NY (US)

( * ) Notice: Subject to any disclaimer, the term of this patent is extended or adjusted under 35 U.S.C. 154(b) by 475 days.

This patent is subject to a terminal disclaimer.

(21) Appl. No.: 12/543,570

(22) Filed: Aug. 19, 2009

(65) Prior Publication Data
US 2009/0313080 A1 Dec. 17, 2009

Related U.S. Application Data

(63) Continuation-in-part of application No. 11/020,060, filed on Dec. 22, 2004, now Pat. No. 7,620,562.

(60) Provisional application No. 60/532,444, filed on Dec. 24, 2003.

(51) Int. Cl.
 *G06Q 10/00* (2012.01)
(52) U.S. Cl. ............... 705/7.21; 705/7.12; 705/7.13; 705/7.18
(58) Field of Classification Search ......... 705/7.12–7.25
See application file for complete search history.

(56) References Cited

U.S. PATENT DOCUMENTS

| | | | | | |
|---|---|---|---|---|---|
| 5,615,121 | A | * | 3/1997 | Babayev et al. | 705/7.22 |
| 5,920,846 | A | * | 7/1999 | Storch et al. | 705/7.14 |
| 5,970,466 | A | * | 10/1999 | Detjen et al. | 705/7.19 |
| 6,304,647 | B1 | * | 10/2001 | Frost | 379/201.12 |
| 6,389,454 | B1 | * | 5/2002 | Ralston et al. | 709/204 |
| 6,578,005 | B1 | * | 6/2003 | Lesaint et al. | 705/7.14 |
| 6,985,871 | B2 | * | 1/2006 | Simon et al. | 705/7.24 |
| 7,069,097 | B1 | * | 6/2006 | Barto et al. | 700/100 |
| 7,188,073 | B1 | * | 3/2007 | Tam et al. | 705/7.16 |
| 7,313,530 | B2 | * | 12/2007 | Smith et al. | 705/7.24 |
| 7,359,864 | B2 | * | 4/2008 | Carlson et al. | 705/7.25 |

(Continued)

OTHER PUBLICATIONS

Go2Broadband Affiliate User's Guide (www.cablelabs.com/projects/go2/, as archived by web.archive.org Dec. 4, 2002).

(Continued)

*Primary Examiner* — Johnna Loftis
*Assistant Examiner* — Alan S Miller
(74) *Attorney, Agent, or Firm* — The Marbury Law Group, PLLC

(57) ABSTRACT

A system and method for creating, scheduling, and managing time slots for installation appointments. Embodiments of the present invention permit a trading partner to offer a customer the ability to schedule installation of cable services on-line. A cable operator maintains an inventory of time slots. One or more time slots from the time slot inventory are offered to a customer based on ordering information received from the customer. A customer selects a time slot from the one or more offered time slots. A cable operator then assigns an installation appointment to the customer within the time slot selected by the customer. A cable operator may also determine the status of the inventory of time slots (e.g., time slots allocated, time slots consumed, and time slots available) for a system, a location, or a trading partner.

17 Claims, 7 Drawing Sheets

U.S. PATENT DOCUMENTS

| | | | | |
|---|---|---|---|---|
| 2001/0047285 | A1* | 11/2001 | Borders et al. | 705/8 |
| 2002/0181685 | A1* | 12/2002 | Doherty et al. | 379/201.12 |
| 2003/0061087 | A1* | 3/2003 | Srimuang | 705/8 |
| 2005/0027580 | A1* | 2/2005 | Crici et al. | 705/8 |

OTHER PUBLICATIONS

Johns, Stuart. "Heuristics to Schedule Service Engineers Within Time Windows." Journal of the Operational Research Society, vol. 46, 1995, pp. 339-346.

Descartes.com. Web pages, Mar. 20, 2000—e-scheduler (pp. 7-9).

Smith Stephen. Reactive Scheduling System. In Brown D. et al., *Intelligent Systems*, 1994.

Shade, J.J.; Orman, A.J. "Scheduling Installations in the Telecommunications Industry." European Journal of Operational Research, vol. 102, 1997, pp. 73-87.

Weigel, Don et al. Applying GIS and OR Techniques to Solve Sears Technician-Dispatching and Home-Delivery Problems. Interfaces, Jan.-Feb. 1999, vol. 29, No. 1, pp. 112-130.

* cited by examiner

ONLINE INSTALLATION SCHEDULING SYSTEM AND METHOD FOR CABLE SERVICES

CROSS REFERENCE TO RELATED APPLICATIONS

This application is a continuation-in-part of patent application Ser. No. 11/020,060 filed Dec. 22, 2004 now U.S. Pat. No. 7,620,562, which application claims priority under 35 U.S.C. §119(e) from provisional application No. 60/532,444 filed Dec. 24, 2003. The 60/532,444 provisional application and the Ser. No. 11/020,060 applications are incorporated by reference herein, in their entireties, for all purposes.

BACKGROUND

The present invention relates in general to provisioning of cable services in a cable system. More specifically, the present invention relates to an online installation scheduling system for high-speed digital services in a cable network.

The increasing popularity of high-speed data (HSD) over cable presents a significant challenge to cable operators to provision customers with the HSD services they desire. Revenue opportunities in the cable industry have evolved along multiple paths as cable-based services and supporting technologies have matured. Video services have evolved from analog and digital video to advanced video services including interactive TV and video-on-demand (VOD). In the past, a few companies dominated high-speed data (HSD) services with multiple system operators (MSOs) providing local distribution. Many cable companies are now moving aggressively to provide their own internal HSD networks, including access to multiple Internet service providers (ISPs). Cable telephony is progressing from secondary and primary line service using circuit-switched technologies to a full range of voice-over-IP (VoIP)-based telephony services, offering custom features and advanced intelligent network services that rival the incumbent local exchange carriers (ILECs).

Typically, cable operators have maintained separate work centers, support systems and skilled technicians for video, HSD and, more recently, telephony. New services have been introduced over time, often with separate back office ordering, billing, dispatch and provisioning platforms. However, the convergence of these services within an IP-based environment makes this operational model inefficient and ineffective. One catalyst for changing this model is the increasing popularity of VoIP telephony, which shares common IP network infrastructure and customer premises equipment with high-speed data services.

With the passage of the Telecommunications Act ("the Act") of 1996, an ILEC, the regulated entity that owns and administers an existing access network, must provide to a requesting telecommunications carrier (the "competitive local exchange carrier" or "CLEC") nondiscriminatory access to network elements on an unbundled basis and allow CLECs to combine such network elements in order to provide telecommunications service. ILECs also have a duty to provide to CLECs interconnection with their network for the transmission and routing of telephone exchange service and exchange access. The interconnection contemplated by the Act provides nondiscriminatory access or interconnection to such services or information as are necessary to allow the requesting CLEC to implement local dialing parity, including nondiscriminatory access to telephone numbers, operator service, directory assistance, and directory listing, with no unreasonable dialing delays.

The provisions of the Act have demonstrated a need for competing exchange carriers to be interconnected so that customers can seamlessly receive calls that originate on another carrier's network and place calls that terminate on another's carrier's network without performing additional activities, such as dialing extra digits, etc. A cable provider desiring to provide VoIP services directly to customers either acts as a CLEC or partners with a CLEC.

Vestiges of the separate service mentality are easily identified. While many customers are now ordering two or more services, some cable operators still maintain a separate customer service representative (CSR) workforce for each service, often using separate ordering and billing systems for each service, and sometimes using a "notes" field to identify service installations that could be coordinated into a single truck roll. A far more efficient approach is to integrate CSR workforces across services and to implement an integrated ordering system environment, either through replacement of old systems or by establishing interfaces that integrate the old systems in an efficient manner. However, this objective is easier stated than achieved.

Significant differences exist in work management, work processes and applications supporting advanced video services, HSD and telephony. Advanced video services require service management and network provisioning applications supporting VOD servers and interactive video services. High-speed data back office operations include managing HSD content servers, e-mail servers and multiple ISP connections. Cable modem installations are migrating to a retail model, in which HSD customers are responsible for completing their own installation.

The work process issues are further complicated when the cable operator offers VoIP services. In the circuit switched environment, the ILEC receives a local service request (LSR) from a CLEC providing service to a customer. The LSR provides detailed data regarding the customer, the CLEC (if applicable) and the services desired by the customer. Circuit-switched and VoIP telephony back office operations for primary line service may require several days of preparation prior to, during, and after the day of install, including:

Communications with the customer's incumbent local exchange carrier (ILEC);
Preparation and implementation of directory listing and directory assistance records;
Preparation and implementation of the E911 record;
Preparation and implementation of the line information database record;
Preparation and transmittal of the customer care record to the interexchange carrier;
Calling number update to the calling number database;
Provisioning of customer line(s) and associated features in the cable operator's circuit switch or softswitch; and
Porting of the customer's existing telephone number from the existing local exchange carrier to the cable operator's circuit switch or softswitch (also referred to as a media gateway controller).

HSD and related services must still be provisioned to the customer. A first-time customer may require the installation of a cable drop to the house. A customer with cable service may require assistance in installing and configuring customer premises equipment (CPE) for one or more services. Scheduling an installation appointment requires coordination of task owners within and without the cable operator's organization.

An installation time slot is a valuable commodity. Coordinating the installation slot with the customer, the installer, the equipment provider, and cable operator can be a daunting task. Typically, scheduling of the installation time slot is done off-line by a CSR and then manually posted to a database for viewing by the trading partner. The trading partner cannot schedule the installation or advise the customer of the installation until the cable operator has acted. Additionally, time slots are not coordinated across all of the services requested by a customer (which may have been ordered through different trading partners). Further, there is no means for monitoring the need for time slots, whether time slots are being used efficiently, or to allocate additional time slots for a particular trading partner.

SUMMARY

Embodiments provide systems and methods for creating, scheduling, and managing time slots to install HSD services in a cable network.

In an embodiment, a system for scheduling installation of services offered by a service provider may include a time slot inventory comprising time slots, an order interface configured to receive orders from a prospective customer, and a time slot management system having a processor that may be configured to execute software instructions. In another embodiment, the time slot inventory may include a plurality of time slots each having a plurality of available installation appointments for installation of a service. In an embodiment, the service may be a high-speed data service, a voice over IP service, and a video service. In yet another embodiment, the order interface may be an online interface, The software instructions may cause the time slot management system to perform various functions. One such function may be establishing an alert trigger for each of the plurality of time slots. By way of illustration and not by way of limitation, an alert trigger may be a condition indicative of a utilization of the plurality of available installation appointments.

The software instructions may also cause the time slot management system to receive via the order interface ordering information and order qualifying information from a prospective customer. By way of illustration and not by way of limitation, the ordering information may include a request for installation of the service, and a customer's name, address, contact number, and payment information. The order qualifying information may include information relating to the state of the installation location.

The software instructions may also cause the time slot management system to qualify the request for installation of the service for scheduling using the order qualifying information.

When the requested service qualifies for scheduling, the software instructions may also cause the time slot management system to select from the time slot inventory at least one available time slot for installation of the service based on the ordering information, display to the prospective customer an offer that includes the at least one available time slot via the order interface, receive from the prospective customer via the order interface a confirmation that includes a selection of a particular time slot of the at least one available time slot by the prospective customer, schedule the installation within the selected time slot; and display the selected time slot to the prospective customer.

The software instructions may also cause the time slot management system to determine whether the condition of the alert trigger established for each of the plurality of time slots is satisfied and issue an alert message when the utilization of the plurality of available installation appointments satisfies the condition of the alert trigger for any one of the plurality of time slots. In an embodiment, the alert message may be an e-mail message.

When the requested service does not qualify for scheduling, the software instructions may also cause the time slot management system to send to the prospective customer a notice via the order interface that the requested service does not qualify for scheduling using the automated scheduling system.

In another embodiment, the condition of the alert trigger is a number of available installation appointments is less than or equal to a threshold determined over a time period.

In yet another embodiment, the plurality of available installation appointments is associated with a time and a date, and the condition of the alert trigger is a next available installation appointment is more than a threshold time period after a current date and time.

In still another embodiment, the processor is further configured to execute software instructions to cause the time slot management system to acquire a number of appointments scheduled for each of the plurality of time slots and determine a percentage utilization for each of the plurality of time slots. By way of illustration and not by way of limitation, a percentage utilization may equal the number of scheduled installation appointments for any one of the plurality of time slots divided by a maximum number of installation appointments available for that time slot, and the condition of the alert trigger may be a percentage utilization for each of the plurality of time slots exceeds a maximum percentage utilization threshold.

In another embodiment, the processor is further configured to execute software instructions to cause the time slot management system to acquire a number of appointments scheduled for each of the plurality of time slots and determine a minimum percentage utilization in a time period for each of the plurality of time slots. By way of illustration and not by way of limitation, a percentage utilization may equal the number of scheduled installation appointments for any one of the plurality of time slots divided by a maximum number of installation appointments available for that time slot, and the condition of the alert trigger may be the percentage utilization for each of the plurality of time slots is less than a minimum percentage utilization threshold.

The software instructions may also cause the time slot management system to receive service availability information, determine from the service availability information whether the service is available to the prospective customer, and, when the service is not available to the prospective customer, send to the prospective customer a notice via the order interface that the requested service is not available. By way of illustration and not by way of limitation, the service availability information may include a zip code and a street address.

In another embodiment, the service is a cable service and the order qualifying information may include affirmative responses to questions directed to whether the prospective customer lives in a house, whether the house is wired for the cable service, and whether a cable outlet is within a threshold distance of a computer.

In an embodiment, the time slot inventory comprises a common slot pool and a reserved slot pool, and the processor is configured to execute software instructions to cause the time slot management system to determine from the ordering information whether the prospective customer is entitled to a time slot held in the reserved slot pool and select the time slot from the reserved slot pool when the prospective customer is entitled to the time slot held in the reserved slot pool. In an embodiment, the reserved slot pool may have time slots grouped by time periods.

In yet another embodiment, the service provider may have various organizational units, and the reserved slot pool is associated with an organizational unit. In this embodiment, the ordering information may associate the prospective customer with the organizational unit.

In another embodiment, the service provider may offer services of trading partners, and the reserved slot pool is associated with a trading partner unit. In this embodiment, the ordering information associates the prospective customer with the trading partner.

DETAILED DESCRIPTION

The following definitions are provided for the purpose of clarity:
CLEC—Competitive local exchange carrier.
CSR—Customer service representative of a cable network operator.
HSD—High-speed data.
ILEC—Incumbent local exchange carrier.
MAC—Media access control.
MTA—Media terminal adapter.
Trading partner—A supplier of a CLEC responsible for providing some aspect of the service to the subscriber.
VoIP—Voice over Internet Protocol.

An embodiment of the present invention is a method using a time slot management system (TSMS) to create, schedule, and manage time slots to efficiently provision, install, and maintain HSD services in a cable network. For the purposes of clarity, in the discussion that follows a time slot is any multiple of fifteen-minute intervals starting at an even hour. Each time slot has a maximum number of installation appointments associated with it. As will be clear to those skilled in the art, other intervals and reference points may be used to determine a time slot without departing from the scope of the present invention.

Figure 1:
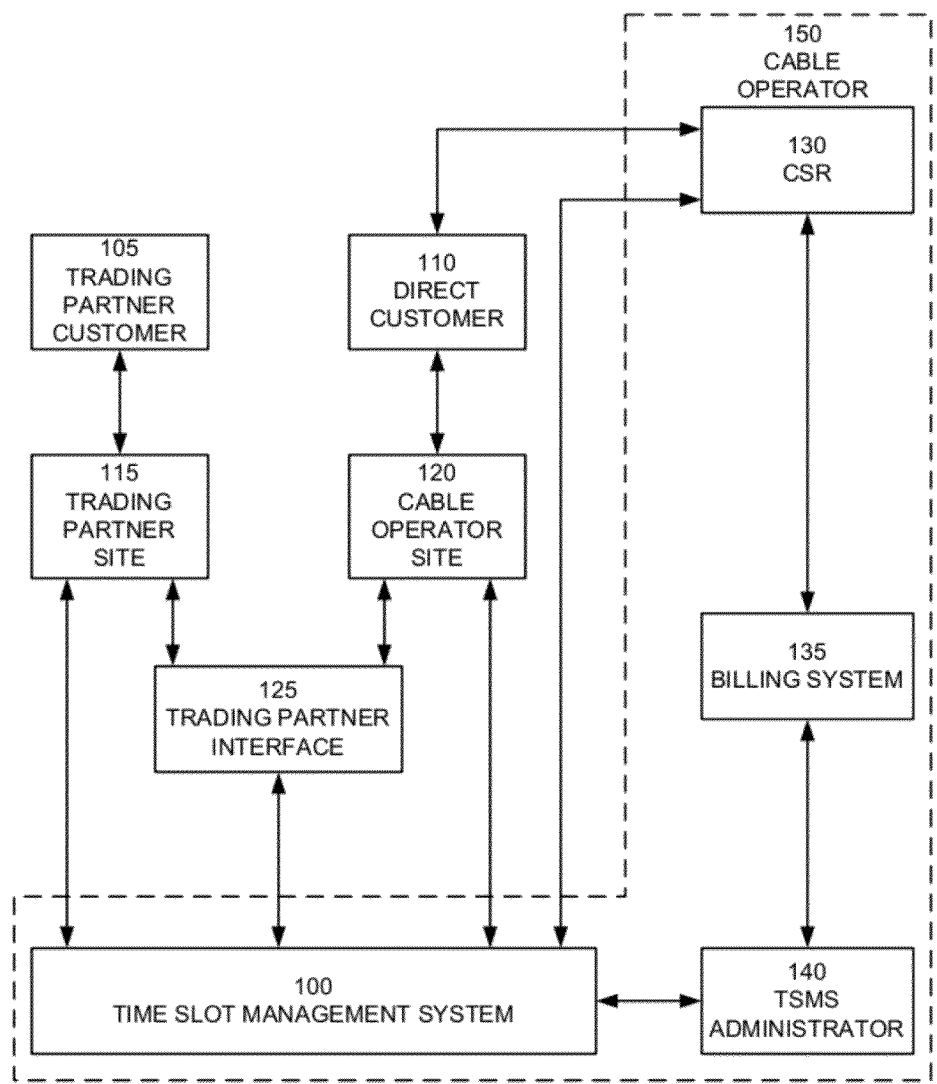
FIG. 1 is a block diagram illustrating a high-level view of a time slot management system (TSMS) incorporated into an online scheduling system according to an embodiment of the present invention.

FIG. 1 is a block diagram illustrating a high-level view of a TSMS incorporated into an online scheduling system according to an embodiment of the present invention. Referring to FIG. 1, a TSMS 100 is accessible to a trading partner customer 105, a direct customer 110, a customer service representative (CSR) 130 and a TSMS administrator 140 of a cable operator 150. The level of accessibility of an entity is determined by permissions (permissions will be discussed in subsequent sections).

The TSMS 100 is configurable by the cable operator 150, meaning the way the TSMS manages time slots is under the control of the TSMS administrator 140. Additionally, the TSMS 100 is accessible by customers placing orders for HSD service directly with the cable operator (a direct customer 110) or through a trading partner (a trading partner customer 105). The TSMS 100 is also adapted to receive an order from a website operated by the trading partner (trading partner site 115) or a cable operator site 120. A customer may initiate a service inquiry through a trading partner interface 125 linked to trading partner site 115.

FIG. 1 further illustrates that the activities of the TSMS 100 interact with the operation of the billing system. This interaction reflects the improved timeliness of data flow to the billing system resulting from improved knowledge of the scheduling and completion of installation afforded by the TSMS 100.

Figure 2:
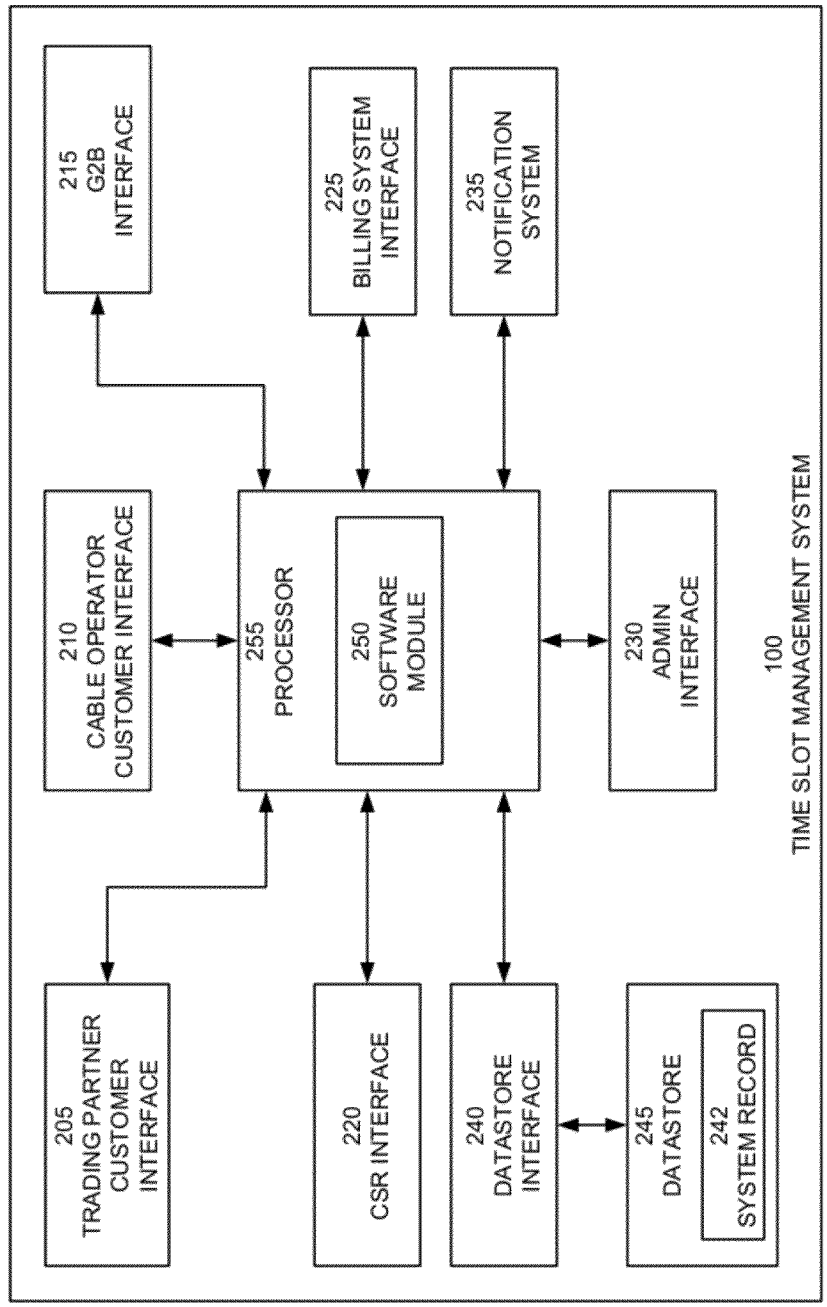
FIG. 2 is a block diagram illustrating logical components of a time slot management system according to an embodiment of the present invention.

FIG. 2 illustrates a block diagram illustrating logical components of a time slot management system according to an embodiment of the present invention. Referring to FIG. 2, TSMS 100 comprises a trading partner customer interface 205, a cable operator customer interface 210, a G2B interface 215, a CSR interface 220, a billing system interface 225, and an administrator interface 230, and a processor 255 all under the control of a software system 250. The software system 250 comprises executable instructions to cause the processor 255 to communicate with a datastore 245 through datastore interface 240. Additionally, the software system 250 operating on processor 255 directs the flow of queries and responses from various interfaces of TSMS 100.

An administrator interface provides an authorized administrator access to configuration records stored in datastore 245. Through the administrator interface 230 and the software system 250 operating on processor 255, the administrator may enable on-line scheduling through the trading partner customer interface 205 and the cable operator customer interface 210. Once enabled, the administrator then configures the TSMS 100 to schedule, manage, and report time slot information according to the needs of the cable operator.

In an embodiment of the present invention, datastore 245 comprises a system record 242 of each cable system operated by a cable operator. By way of illustration and not as a limitation, the system record comprises a cable system identifier, a division identifier, and contact information (e.g., phone number(s), URL, e-mail address(es), and names of critical facility personnel). Using the administrator interface 230 of the TSMS 100, the administrator retrieves system record 242 of a cable system to be enabled or disabled to offer on-line scheduling of time slots. Enabling a cable system for on-line scheduling further enables the various interfaces and software system 250 operating on processor 255 to perform the tasks described below. Additionally, system record 242 in an enabled system further comprises time slot information for that system and access rules that determine how and by whom the time slot information may be viewed.

Figure 3:
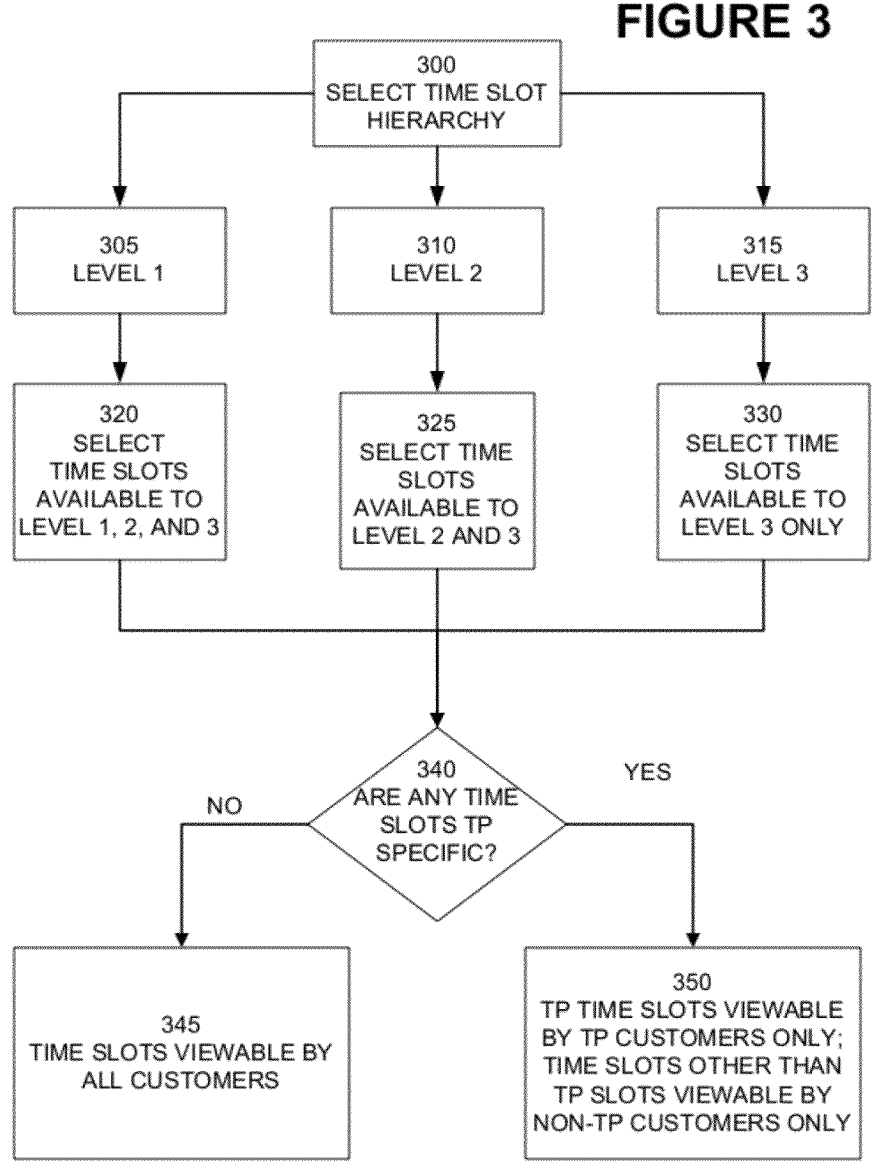
FIG. 3 is a block diagram illustrating an organization of time slot information using three levels according to an embodiment of the present invention.

In an embodiment of the present invention, time slot information may be organized to mirror the organization of the cable operator. FIG. 3 is a block diagram illustrating an organization of time slot information using three levels according to an embodiment of the present invention. As will be apparent to those skilled in the art, time slot information may be organized according to other structures without departing from the scope of the present invention.

Referring to FIG. 3, a TSMS administrator selects a time slot hierarchy from three available levels. However, the invention is not so limited. As will be appreciated by those skilled in the art, any number of levels may be defined without departing from the scope of the present invention.

In one embodiment of the present invention, the TSMS administrator selects level 1 305. Level 1 305 is a global level meaning that all time slots are available to all other organizational units within the cable operator's organization. The TSMS administrator then selects time slots available to levels 1, 2 and 3 320.

In another embodiment of the present invention, the TSMS administrator selects level 2 310. Level 2 310 represents one of a plurality of organizational units within the cable operator's organization. Time slots established for level 2 310 are available to all component organizational structures within level 2 310 (i.e., level 2 and level 3). The TSMS administrator then selects time slots available to levels 2 and 3 325.

In yet another embodiment of the present invention, the TSMS administrator selects level 3 315. Level 3 315 represents one of a plurality of organizational structures within level 2 310. Time slots established for level 3 315 are only available to the level 3 organizational unit 315. The TSMS administrator then selects time slots available to level 3 330.

For example, a cable operator that is organized according to a hierarchical structure of a division-cable system-management area may organize time slots at the division level, cable system level, or within a defined management area. However, this is not meant as a limitation. As will be apparent to those skilled in the art, other time slot information organization schemes may be implemented without departing from the scope of the present invention. The TSMS operates the same regardless of the manner in which the time slot information is managed. However, time slots and resources related to the installation and servicing of HDS within a time slot are not shared in multi-level management structures without intervention by the administrator.

By way of illustration, organization of time slots at the division level permits entry of time slot information to be populated to all cable systems and management areas in a division. For example, every Tuesday from 10:00 A.M. to 12:00 P.M., four installation appointments for HSD are available. These installation appointments are available for each cable system and management area throughout a division. Organization of time slots at the cable system level populates time slot information across the whole cable system. For example, every Wednesday from 1:15 P.M. to 4:30 P.M., six installation appointments for HSD are available. These installation appointments are available for each management area within the cable system in a division. Organization of time slots at the management area level permits entry of time slot information to be populated to a particular management area in a division. For example, every Saturday from 8:30 a.m. to 11:45 a.m., five installation appointments for HSD are available. These installation appointments are available only for a specific management area within the cable system.

As will be discussed below, HSD customers seeking to make an installation appointment online will request an available date/time selection.

Referring again to FIG. 3, time slots may be made accessible by all trading partners and customers or associated with a particular trading partner and its customers. The TSMS administrator determines whether to associate one or more time slots with a trading partner (TP) 340. If none of the time slots is associated with a particular TP, all time slots are available to (and viewable by) all customers and TPs 345. If any time slot is associated with a TP, then the time slots associated with that TP are only available to (and viewable by) the customers of that TP and the time slots not associated with the TP are available to (and viewable by) customers who are not customers of that TP 350.

For example, every Thursday from 1:45 P.M. to 4:00 P.M., six installation appointments for HSD are available. In a pooled mode, all customers can draw from these installation appointments regardless of the trading partner associated with the customer. Alternatively, the installation appointments may be designated for trading partner "A." Only customers associated with trading partner A can access these installation appointments as a selection if there are any available installation appointments remaining.

The TSMS may also be configured to have both a pool and specific allocated time slots. For example, every Saturday from 8:00 A.M. to 10:30 A.M., thirty installation appointments for HSD are available. The administrator may allocate six installation appointments exclusively for customers associated with trading partner "A," six installation appointments available exclusively for customers associated with trading partner "B," and eighteen installation appointments reserved for all other trading partners. Customers associated with trading partners "A" and "B" are limited to the number of installation appointments set up specifically for them. Once all installation appointments within a time slot are assigned, that timeslot will not appear as a choice for those customers. Customers from other trading partners will draw installation appointments only from the general pool of time slots.

In another embodiment of the present invention, time slots are allocated by time period and by trading partner. For example, Saturday from 8:00 A.M. to 10:30 A.M., installation appointments for HSD are available only for customers associated with trading partner "A," and installation appointments from 10:45 A.M. to 12:45 P.M are available only for customers associated with trading partner "B." Installation appointments from 1:00 P.M. to 3:00 P.M. are available for customers associated with other trading partners. Customers associated with trading partners A and B are limited to viewing only the timeslot specifically set up for each. Customers associated with other trading partners are able to view only the timeslots in the general pool.

In an embodiment of the present invention, the allocation of time slots affects the information that is presented to the online customer. The TSMS determines if a customer is associated with a trading partner for the purpose of the time slot being requested and, if so, whether any time slots are allocated for that trading partner. If TSMS finds any timeslots allotted specifically to the trading partner, the information for those timeslots will be displayed. If no time slots have been allocated for the trading partner associated with the customer, only installation appointments available in a general pool will be displayed. However, the customer will not be presented the general pool and allocated installation appointments simultaneously.

By way of illustration and not as a limitation, a customer associated with trading partner XYZ is requesting to view available installation appointments. Time slots have been allocated to trading partner XYZ but all of the installation appointments within these time slots have been assigned. While installation appointments are available in a general pool, the customer will not be able to view those installation appointments. Rather, the customer will receive a message (via the notification system 235) that a CSR will contact the customer to schedule an appointment.

Referring again to FIG. 2, in another embodiment of the present invention, the notification system 235 issues alert messages relating to time slot allocations according to parameters established by the administrator. In this embodiment, alert messages are emailed to designated recipients when preset parameters are met.

Figure 4:
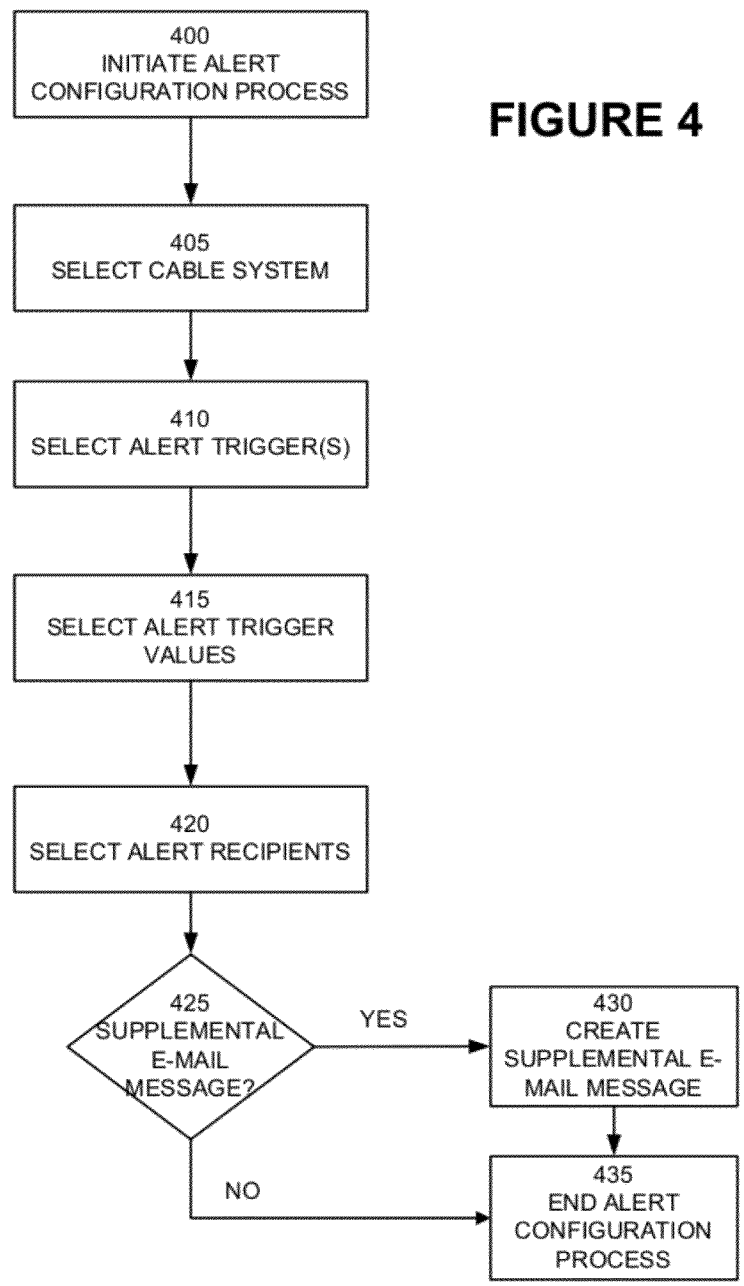
FIG. 4 is a block diagram illustrating a process by which a TSMS is configured at a division cable system level to send alert messages according to an embodiment of the present invention.

FIG. 4 is a block diagram illustrating a process by which a TSMS is configured at a division cable system level to send alert messages according to an embodiment of the present invention.

An administrator of a TSMS initiates an alert configuration process 400. The administrator selects a cable system 405 to which the alert configuration is to apply and the "triggers" 410 that will used to cause an alert to be issued.

By way of illustration, in an exemplary embodiment of the present invention, the following triggers may be set by the administrator:

When the maximum percent utilization of installs has been reached for any timeslot in the cable system.
When a pre-set minimum consumption level has not been met for any timeslot in the cable system.
When too few appointments are available looking at the cable system as a whole.
When the first appointment available is too many days out looking at the cable system as a whole.

In this exemplary embodiment of the present invention, alert parameters are configured per cable system and apply to all the management areas and timeslots within that cable system. However, this is not meant as a limitation. In another embodiment, the alert parameters are configured so as to mirror the organization of the cable operator.

The trigger values are set 415 appropriate to the alert triggers previously selected. By way of illustration and not as a limitation, an alert will be triggered for the entire cable system if the following conditions are met:

"X" or fewer appointments over the next "y" days.
The earliest available appointment is more than "x" days away.
If any timeslot in any management area within the cable system meets the condition:
  Maximum percentage utilization reached for a timeslot.
  Minimum percentage utilization NOT reached in "x" days for a timeslot.
  Where the percentage utilization=number of scheduled installation appointments within a time slot divided by the total number of installation appointments associated with that time slot.

Referring again to FIG. 4, the administrator identifies the recipients of the alert 420. In this embodiment, an alert will be sent to the designated recipients once a day per type of alert with all information relating to the alert parameters for that alert type within the cable system. The administrator may choose to add a supplemental message 425 to the alert e-mail. If a supplemental message is desired, it is created 430 by the administrator. If a supplemental message is not desired, the alert configuration process ends 435.

Referring again to FIG. 2, in another embodiment of the present invention, the administrator interface 230 also provides information regarding time slot usage on line. The administrator may choose to view the time slot usage for an entire division, for a particular cable system, for a specific management area, for the general pool of trading partners, or a specific trading partner. Additionally, through the administrator interface 230, the administrator may update the number of installation appointments for any of the time slots and limit the ability of a particular timeslot to be viewed online.

The administrator interface 230 provides a structured means of modifying a time slot allocation and redefining the number of installs associated with that time slot. In an embodiment of the present invention, the administrator interface uses drop down menus to offer options to the administrator to establish (or re-establish) time slot allocations for specific days of the week over a specified time period for either a general pool or one or more specific trading partners. The time slot is specified by a start time and an end time. Additionally, a number of installation appointments associated with that time slot is specified. The data that is presented to the administrator is stored in system record 242 in datastore 245. Upon modifying a data field, the datastore notification system 235 displays a confirmation statement to the administrator reflecting the data as entered by the administrator and requests confirmation from the administrator. If the change is confirmed, the new data are stored in system record 242. A final confirmation statement is then issued by the notification system 235 and displayed to the administrator.

In yet another embodiment of the present invention, the notification system 235 issues an alert if a change made to an existing time allocation or installation appointment causes a conflict with other alert parameters or existing installation appointments. By way of illustration and not as a limitation, an error message will be issued if:

all required fields are not completed;
a "To" date is entered that is before an associated "From" date; or
an invalid month/day combination is entered (e.g., Feb. 31).

If data are entered that conflict with information already stored in the applicable system record 242, an overwrite confirmation message will be sent by the notification system 235. For example, the following message may be issued:

"The following time slots exist in the database. In some cases the total number of installs you entered is lower than the number of installs currently consumed or you are choosing to hide the time slots with appointments scheduled. Press submit to replace the data or cancel to cancel your entire request. You may also go back and edit your selection."

The administrator may confirm the overwrite message to make the changes despite the warning.

Referring again to FIG. 2, trading partner customer interface 205 and cable operator customer interface 210 represent different entry points to the TSMS 200 but perform substantially the same tasks. The entry point of a customer determines whether a customer has a relationship with a trading partner for the purposes of ordering a service and scheduling an installation appointment. As previously discussed, a customer's access to time slots may depend on whether the customer is associated with a trading partner at the ordering stage. For the purposes of this discussion, the interfaces will be treated as logical equivalents and only the trading partner customer interface will be discussed in detail.

Figure 5:
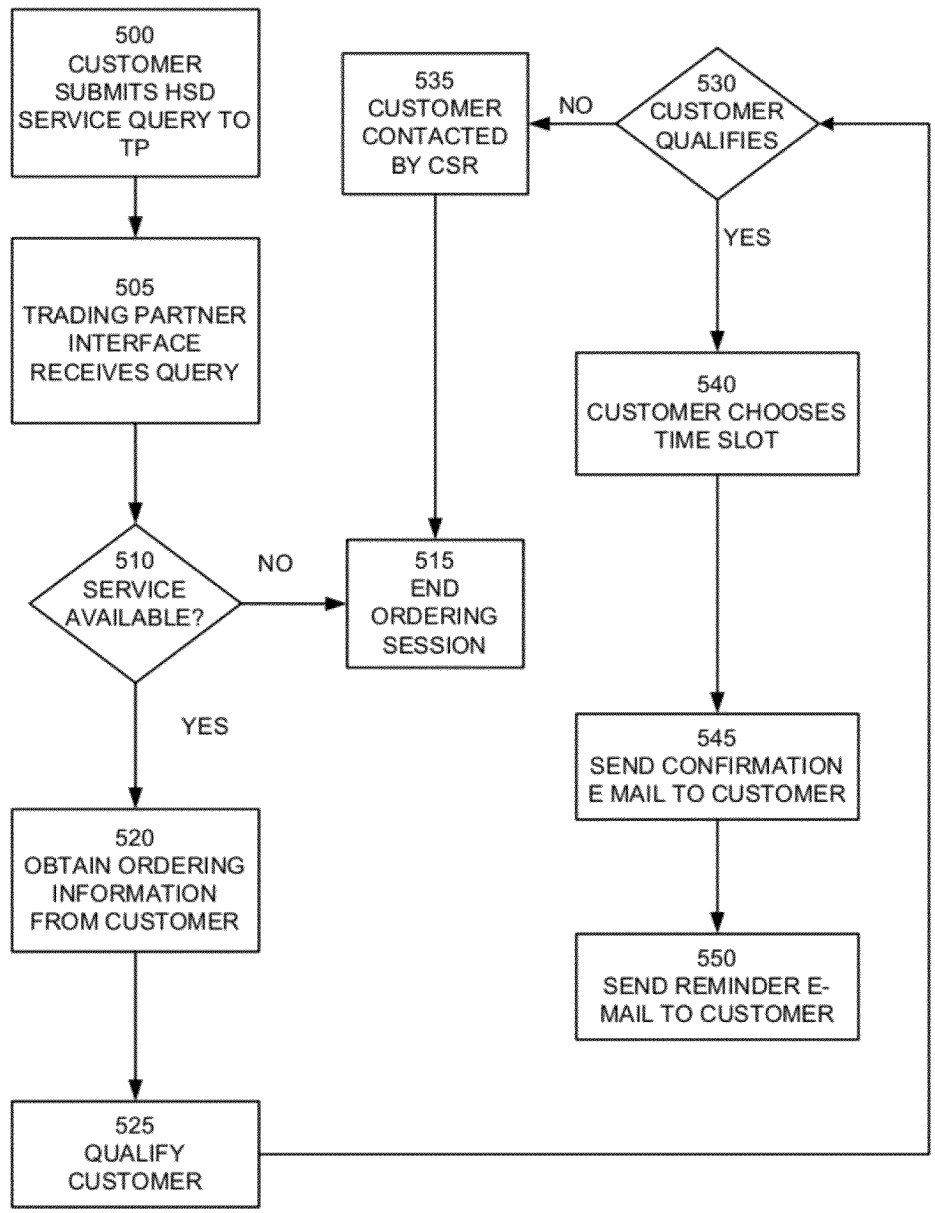
FIG. 5 is a block diagram illustrating the coordination of a trading partner interface and a customer interface according to an embodiment of the present invention.

FIG. 5 is a block diagram illustrating the coordination of a trading partner interface and a customer interface according to an embodiment of the present invention. In an embodiment of the present invention, the trading partner customer interface (205—see FIG. 2) is coordinated with the operation of trading partner interface (215—see FIG. 2). In this embodiment, a customer may request an assessment of service availability through participating trading partners of the cable operator that use the trading partner interface 215. By way of illustration and not as a limitation, the trading partner interface 215 may implement a Go2Broadband$^{SM}$ (G2B), a service of CableLabs®, on a server or other computing device.

The trading partner interface 215 receives query messages and issues responses regarding the availability of service based on the location of the customer. If the customer is located in an area served by the cable operator, the trading partner interface 205 presents the customer with ordering information.

Referring to FIG. 5, a customer submits an HSD service inquiry to a trading partner of a cable operator 500. The inquiry is received by the trading partner interface 505 and a determination is made whether the customer is within the service area of the cable operator 510. If service cannot be provided to the customer, the service ordering session ends 515. If service can be provided to the customer, ordering information is obtain from the customer 520. By way of illustration, ordering information may include the customer's name, address, contact number, and payment information.

Upon completion of the ordering information, the customer is then presented with a set of qualification questions 525 to determine whether the customer qualifies to use the online scheduling features of the TSMS 530 and to provide information useful to assess the time and resources needed for installation.

Referring again to FIG. 2, the qualification questions reside in the system record 242 and are configured by the administrator through the administrator interface 230. In this embodiment of the present invention, three questions are posed to the customer, although this is not meant to be a limitation:

1. Do you live in a house or an apartment?
2. Has this location ever been wired for cable services?
3. Is a cable outlet within 4-6 feet of your PC?

All customers are required to answer all three questions in order to proceed with scheduling an appointment online. The administrator may establish that the answers to 2 or 3 or both must be "yes" in order to proceed with scheduling an appointment online.

Referring again to FIG. 5, if the customer does not qualify to schedule an installation appointment online, the customer will receive an online message via the notification system 235 that a representative will call them to schedule an appointment 535 and the online ordering session ends 515.

A "qualified" customer is presented with a range of time slots to choose to have the service installed 540. The time slots made available to the customer depend on the trading partner that the customer is associated with and the lead times configured into the TSMS 200 by the administrator.

A customer who schedules an installation appointment online and who provides an e-mail address will receive a confirmation e-mail 545 from the notification system 235 indicating the date/time requested by the customer. By way of illustration and not as a limitation, the confirmation e-mail comprises:
  Customer Name
  Service Name
  Order Acknowledgement Number
  From Time
  To Time
  Requested Installation Date
  Supplementary text entered for each cable system configurable at the cable system level The notification system 235 will also send a reminder e-mail 550 when the TSMS 200 receives a work order from the billing system 135 that has data in an Action/Time field (scheduled installation data). The administrator sets the amount of time (in days) in advance of the installation date that the notification e-mail is sent. The number of advance days is configurable at the cable system level. By way of illustration and not as a limitation, the confirmation e-mail comprises:
  Customer Name
  Address in TSMS
  Service Name
  Service Code
  Order Acknowledgement Number
  Work Order number
  From Time
  To Time
  Scheduled Installation Date
  Supplementary text entered for each cable system configurable at the cable system level Ordering information is accessible to customer service representatives (CSRs) through the CSR interface 220 or through the billing system interface 225. With respect to the billing system interface 225, scheduling data may be exported to the billing system and accessed by dispatch and installation personnel during installation.

Figure 6:
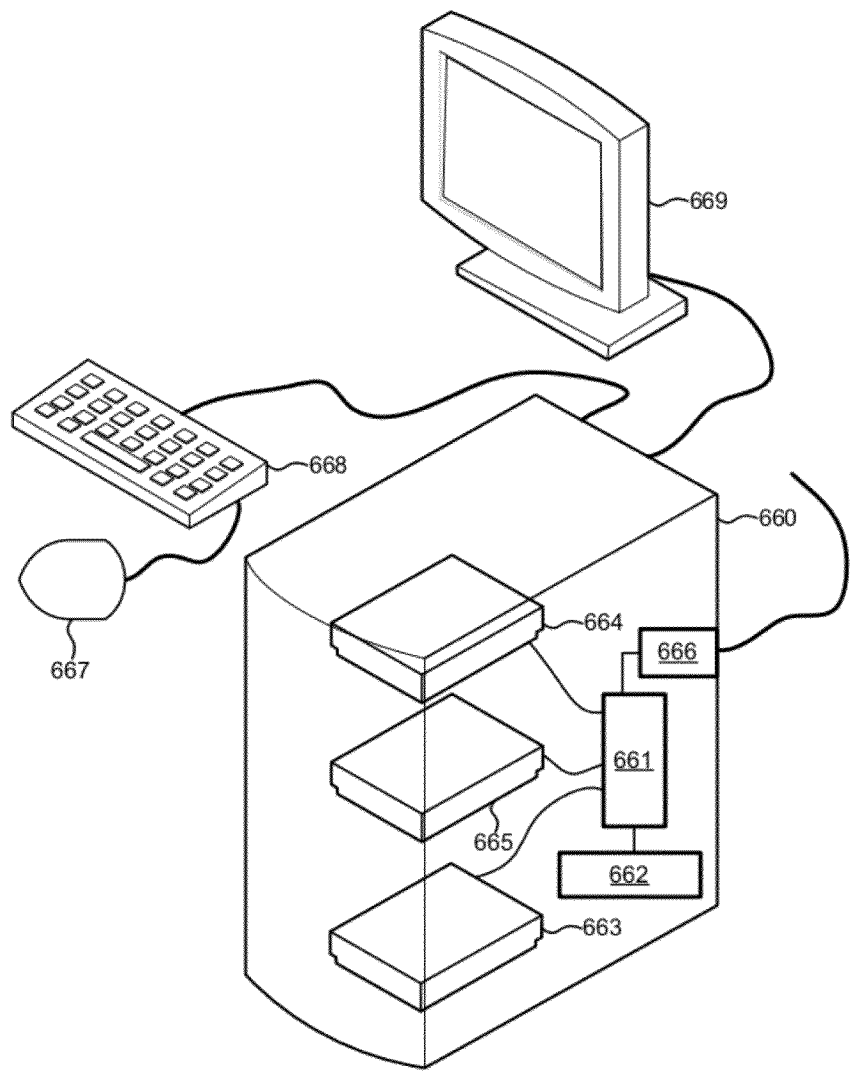
FIG. 6 is a block diagram illustrating functional components of a personal computer.

As indicated above, the various functions of the time slot management system and the determinations made by the time slot management system may be performed using a processor (such as processor 255 illustrated in FIG. 2) executing software instructions (such as software module 250 illustrated in FIG. 2). For example, the processor of a personal computer may be used for this purpose. By way of illustration, the functional components of a personal computer 660 are illustrated in FIG. 6. Such a personal computer 660 typically includes a processor 661 coupled to volatile memory 662 and a large capacity nonvolatile memory, such as a disk drive 663. The computer 660 may also include a floppy disc drive 664 and a compact disc (CD) drive 665 coupled to the processor 661. Typically the computer device 660 will also include a pointing device such as a mouse 667, a user input device such as a keyboard 668 and a display 669. The computer device 660 may also include a number of connector ports coupled to the processor 661 for establishing data connections or receiving external memory devices, such as USB or FireWire® connector sockets or other network connection circuits 666 for coupling the processor 661 to a network. In a notebook configuration, the computer housing includes the pointing device 667, keyboard 668 and the display 669 as is well known in the computer arts.

Figure 7:
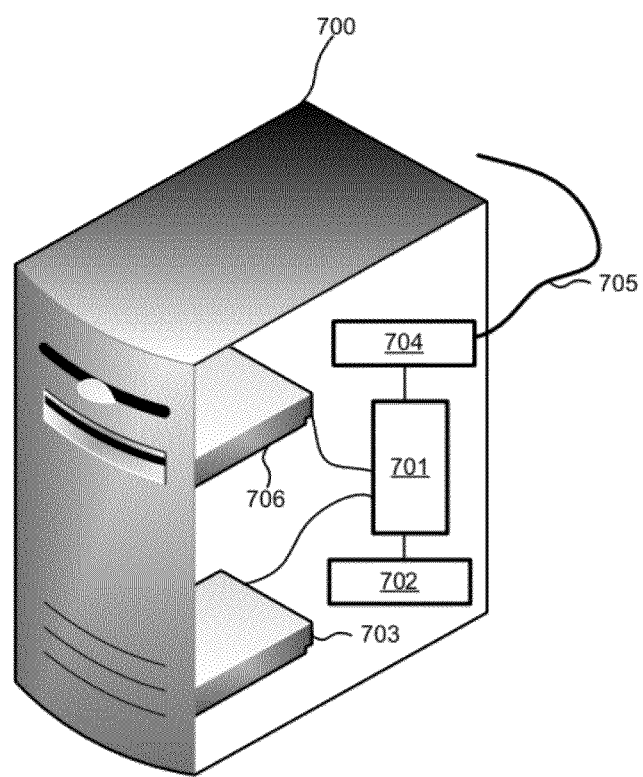
FIG. 7 is a block diagram illustrating functional components of a server.

A number of the aspects described above may also be implemented with any of a variety of remote server devices, such as the server 700 illustrated in FIG. 7. Such a server 700 typically includes a processor 701 coupled to volatile memory 702 and a large capacity nonvolatile memory, such as a disk drive 703. The server 700 may also include a floppy disk drive and/or a compact disc (CD) drive 706 coupled to the processor 701. The server 700 may also include a number of connector ports 704 coupled to the processor 701 for establishing data connections with network circuits 705.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of the computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a computer-readable medium. Computer-readable media include both computer storage media and communication media including any medium that facilitates transfer of a computer program from one place to another. Storage media may be any available media that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of media. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein. Further, any reference to claim elements in the singular, for example, using the articles "a," "an," or "the," is not to be construed as limiting the element to the singular.

What is claimed is:

1. A system for scheduling installation of services offered by a service provider comprising:
    a time slot inventory comprising time slots, wherein the time slot inventory comprises a plurality of time slots each comprising a plurality of available installation appointments for installation of a service;
    an order interface configured to receive orders from a prospective customer;
    a time slot management system comprising a processor, wherein the processor is configured to execute software instructions to cause the time slot management system to perform the functions of:
        establishing an alert trigger for each of the plurality of time slots, wherein the alert trigger comprises a condition indicative of a utilization of the plurality of available installation appointments;
        receiving via the order interface ordering information and order qualifying information from a prospective customer, wherein the ordering information comprises a request for installation of the service and wherein the order qualifying information comprises information relating to the state of the installation location;
        qualifying the request for installation of the service for scheduling using the order qualifying information;
        when the requested service qualifies for scheduling:
            selecting from the time slot inventory at least one available time slot for installation of the service, wherein the at least one available time slot is selected based on the ordering information;
            displaying to the prospective customer an offer comprising the at least one available time slot via the order interface; and
            receiving from the prospective customer via the order interface a confirmation, wherein the confirmation comprises selection of a particular time slot of the at least one available time slot by the prospective customer;
            scheduling the installation within the selected time slot;
            displaying the selected time slot to the prospective customer;
        determining whether the condition of the alert trigger established for each of the plurality of time slots is satisfied; and
        issuing an alert message when the utilization of the plurality of available installation appointments satisfies the condition of the alert trigger for any one of the plurality of time slots.

2. The system of claim 1, wherein the condition of the alert trigger is a number of available installation appointments is less than or equal to a threshold determined over a time period.

3. The system of claim 1, wherein the plurality of available installation appointments is associated with a time and a date, and wherein the condition of the alert trigger is a next available installation appointment is more than a threshold time period after a current date and time.

4. The system of claim 1, wherein the processor is further configured to execute software instructions to cause the time slot management system to perform the functions of acquiring a number of appointments scheduled for each of the plurality of time slots and determining a percentage utilization for each of the plurality of time slots, wherein the percentage utilization equals the number of scheduled installation appointments for any one of the plurality of time slots divided by a maximum number of installation appointments available for that time slot, and wherein the condition of the alert trigger is the percentage utilization for each of the plurality of time slots exceeds a maximum percentage utilization threshold.

5. The system of claim 1, wherein the processor is further configured to execute software instructions to cause the time slot management system to perform the functions of acquiring a number of appointments scheduled for each of the plurality of time slots and determining a minimum percentage utilization in a time period for each of the plurality of time slots, wherein the percentage utilization equals the number of scheduled installation appointments for any one of the plurality of time slots divided by a maximum number of installation appointments available for that time slot and wherein the condition of the alert trigger is the percentage utilization for each of the plurality of time slots is less than a minimum percentage utilization threshold.

6. The system of claim 1, wherein the alert message is an e-mail message.

7. The system of claim 1, wherein the service is selected from the group consisting of high-speed data service, voice over IP service, and video service.

8. The system of claim 1, wherein the processor is further configured to execute software instructions to cause the time slot management system to perform the function of when the requested service does not qualify for scheduling, sending to the prospective customer a notice via the order interface that the requested service does not qualify for scheduling using the automated scheduling system.

9. The system of claim 1, wherein the order interface is an online interface.

10. The system of claim 1, wherein the ordering information comprises customer's name, address, contact number, and payment information.

11. The system of claim 1, wherein the processor is further configured to execute software instructions to cause the time slot management system to perform the functions of:
receiving service availability information;
determining from the service availability information whether the service is available to the prospective customer; and
when the service is not available to the prospective customer, then sending to the prospective customer a notice via the order interface that the requested service is not available.

12. The system of claim 11, wherein service availability information is selected from the group consisting of a zip code and a street address.

13. The system of claim 1, wherein the service is a cable service, wherein the order qualifying information comprises affirmative responses to questions directed to whether the prospective customer lives in a house, whether the house is wired for the cable service, and whether a cable outlet is within a threshold distance of a computer.

14. The system of claim 1, wherein the time slot inventory comprises a common slot pool and a reserved slot pool, and wherein the processor is further configured to execute software instructions to cause the time slot management system to perform the functions of:
determining from the ordering information whether the prospective customer is entitled to a time slot held in the reserved slot pool; and
selecting the time slot from the reserved slot pool when the prospective customer is entitled to the time slot held in the reserved slot pool.

15. The system of claim 14, wherein the service provider comprises organizational units and the reserved slot pool is associated with an organizational unit, and wherein the ordering information associates the prospective customer with the organizational unit.

16. The system of claim 14, wherein the service provider offers services of trading partners and the reserved slot pool is associated with a trading partner unit, and wherein the ordering information associates the prospective customer with the trading partner.

17. The system of claim 14, wherein the reserved slot pool comprises time slots grouped by time periods.

* * * * *